United States Patent

Toyama

[11] Patent Number: 5,787,930
[45] Date of Patent: Aug. 4, 1998

[54] HIGH-LOW PRESSURE PASSAGE SWITCHING DEVICE IN HEATING-COOLING APPARATUS

[75] Inventor: Isamu Toyama, Fuji, Japan

[73] Assignee: Fuji Injector Corporation, Odawara, Japan

[21] Appl. No.: 728,981

[22] Filed: Oct. 11, 1996

[30] Foreign Application Priority Data

Aug. 15, 1996 [JP] Japan ..................... 8-248456

[51] Int. Cl.$^6$ ............................................. F16K 11/072
[52] U.S. Cl. ........................... 137/625.43; 137/625.46
[58] Field of Search ...................... 137/625.43, 625.46

[56] References Cited

U.S. PATENT DOCUMENTS

| | | | |
|---|---|---|---|
| 2,519,574 | 8/1950 | Hall | 137/625.43 |
| 3,796,232 | 3/1974 | Dalton | 137/625.43 X |
| 5,251,670 | 10/1993 | Bates | 137/625.46 |

FOREIGN PATENT DOCUMENTS 61-6468  1/1986  Japan .

*Primary Examiner*—John Fox
*Attorney, Agent, or Firm*—Wenderoth, Lind & Ponack

[57] ABSTRACT

A high-low pressure passage switching device in a heating-cooling apparatus comprises an air-tight housing, a flowing passage switching rotor rotatable normally and reversely at a predetermined angle of rotation about a shaft within the air-tight housing, the rotor being provided with a first switching passage and a second switching passage which are open to a first end face and arranged side by side on a circular orbit about the shaft, and also with a third switching passage which is open to a second end face axially opposing the first end face. The third switching passage is communicated with the first switching passage and the second switching passage within the rotor, the first through third switching passages being formed in parallel with the shaft. A first connecting port to be connected with a high pressure gas outlet port of a compressor is formed in a first end wall of the housing, the first end wall being disposed opposite the first end face of the rotor. The first connecting port is connected to a selected one of the first and second switching passages which are rotated normally and reversely in accordance with normal and reverse rotation of the rotor. A second connecting port and a third connecting port to be connected respectively with one and the other ends of a condenser are formed in a second end wall of the housing opposite the second end face of the rotor.

3 Claims, 5 Drawing Sheets

HIGH-LOW PRESSURE PASSAGE SWITCHING DEVICE IN HEATING-COOLING APPARATUS

BACKGROUND OF THE INVENTION

1. Field of the Invention

This invention relates to a high-low pressure passage switching device for a coolant in a heating-cooling apparatus, namely an, air-conditioning apparatus.

2. Brief Description of the Prior Art

Japanese Patent Application Laid-Open No. Sho 61-6468 discloses a typical example of a high-low pressure passage switching valve for a coolant in a conventional heating-cooling apparatus.

As shown in FIG. 6, the switching valve has a high pressure gas inlet port 2 which is formed in a side wall of an air-tight outer tube 1 and which is connected to an outlet port of a compressor 10, so that the outer tube 1 is normally filled with a high pressure gas. The switching valve also has first and second high/low pressure gas inlet/outlet ports 3, 4 connected to a condenser (an indoor coil 11a and an outdoor coil 11b) and a low pressure gas outlet port 5 connected to an inlet port of the compressor 10, the ports 3, 4 and 5 being arranged, side by side, on that part of the side wall of the outer tube 1 which is located opposite the high pressure gas inlet port 2. A slide block 6 acting as a flowing passage switching valve is disposed within the outer tube 1 such that the block 6 is capable of axially and linearly sliding, rightwardly and leftwardly, along an inner surface of that part of the outer tube 1 where the ports 3, 4 and 5 are open. The rightward and leftward sliding of the slide block 6 causes a selected one of the first and second high/low pressure gas inlet/outlet ports 3, 4 to communicate with the low pressure gas outlet port 5 through the slide block 6. By doing this, a proceeding direction of a cooling gas, this gas coming from the compressor 10 and passing through the condensers 11a, 11b, is switched to the opposite direction.

The outer tube 1 is provided on an inner curved-surface thereof with a valve seat 11 so that the slide block 6 linearly slides on the surface consisting of a planar surface of the valve seat, and a high pressure gas within the outer tube 1 is supplied to the slide block 6 to urge the block 6 against the surface of the valve seat 11 in an air-tight manner.

In the above-mentioned prior art, as means for actuating the slide block 6, there are provided of a pair of pistons 7, 8 connected to the slide block 6 and a pilot valve 9 for actuating the pistons 7, 8 utilizing a difference between a high pressure and a low pressure of a gas (coolant) taken into and discharged out of the compressor 10 via the switching valve within the outer tube 1.

However, the above switching valve has the problem that since the passage switching slide block 6 is of a one-side abutment type, intimate contact of the sliding surface is difficult to obtain, thus resulting in insufficient sealing.

Furthermore, since a high pressure is supplied normally from the high pressure gas inlet port 2 to the comparatively large sliding surface of the slide block 6 so that the block 6 linearly slides, slide resistance is overly produced at the sliding surface. Since this prevents a smooth sliding of the slide block 6, responsiveness of the block 6 is degraded when the valve is switched. Moreover, since the slide block 6 is repeatedly slid under high pressure, it is susceptible to wear. This again enhances the problem of insufficient sealing.

In order to cope with the structural problem just mentioned, it is necessary to make such efforts that a slide block sliding valve seat 11 is disposed on the inner curved-surface of the outer tube 1, materials of the slide block 6 and valve seat 11 are severely selected, machining techniques are improved, and the like.

Also, in the above prior art, as means for actuating the slide block 6, a pair of pistons 7, 8 connected to the slide block 6 are disposed within the outer tube 1 and there is the provision of the pilot valve 9 for actuating the pistons 7, 8 utilizing a difference between a high pressure and a low pressure of gas (coolant) taken into and discharged out of the compressor 10 via the switching valve, thus requiring piping therefor. Accordingly, the construction is necessarily complicated and the numbers of component parts and assembling processes are very high. In addition, the cost is high, too.

The present invention has been accomplished in view of the above problems inherent in the prior art.

SUMMARY OF THE INVENTION

It is, therefore, an object of the present invention to provide a high-low pressure passage switching device in a heating-cooling apparatus, in which the inconveniences involved in the prior art are drastically obviated and the intended switching of the flowing passage is appropriately achieved.

To achieve the above object, according to the present invention, there is essentially provided a high-low pressure passage switching device in a heating-cooling apparatus comprising an air-tight housing; a flowing passage switching rotor rotatable normally and reversely at a predetermined angle of rotation about a shaft within the air-tight housing; the rotor being provided with a first switching passage and a second switching passage which are open to a first end face and arranged side by side on a circular orbit about the shaft, and also with a third switching passage which is open to a second end face axially opposing the first end face, the third switching passage being communicated with the first switching passage and the second switching passage within the rotor, the first through third switching passages being formed in parallel with the shaft; a first connecting port to be connected with a high pressure gas outlet port of a compressor being formed in a first end wall of the housing, the first end wall being disposed opposite the first end face of the rotor, the first connecting port being connected to a selected one of the first and second switching passages which are rotated normally and reversely in accordance with normal and reverse rotation of the rotor; a second connecting port and a third connecting port to be connected respectively with one and the other ends of a condenser being formed in a second end wall of the housing opposite the second end face of the rotor, such that the second and third ports are arranged side by side on a circular orbit about the shaft; a selected one of the second and third ports being communicated with the third switching passage which is rotated normally and reversely in accordance with normal and reverse rotation of the rotor, the unselected connecting port being caused to be open to the interior of the housing; a fourth connecting port formed in the second end wall, the fourth connecting port being open to the interior of the housing and connected to a low pressure gas inlet port of the compressor; a low pressure gas introduced into the housing from the condenser through the unselected one of the second and third connecting ports being supplied into the low pressure gas inlet port of the compressor through the fourth connecting port; and a high pressure gas discharged from the high pressure gas outlet port of the compressor being caused to flow into a communication passage constituted by the selected one of the first and second switching passages and the third switching passage through the first connecting port, a high pressure gas discharged from the third switching passage being supplied to the condenser through the selected one of the second and third connecting ports.

It is preferred that the first through third switching passages are formed in parallel with the shaft, the third switching passage having its center at a middle part between the first switching passage and the second switching passage, the third switching passage having a larger bore than those of the first and second switching passages, ends of the bores of the first and second switching passages being communicated at a bore end of the third switching passage.

The sum of the opening areas of the first and second switching passages may be generally the same as an opening area of the third switching passage.

DETAILED DESCRIPTION OF THE EMBODIMENTS

Figure 6:
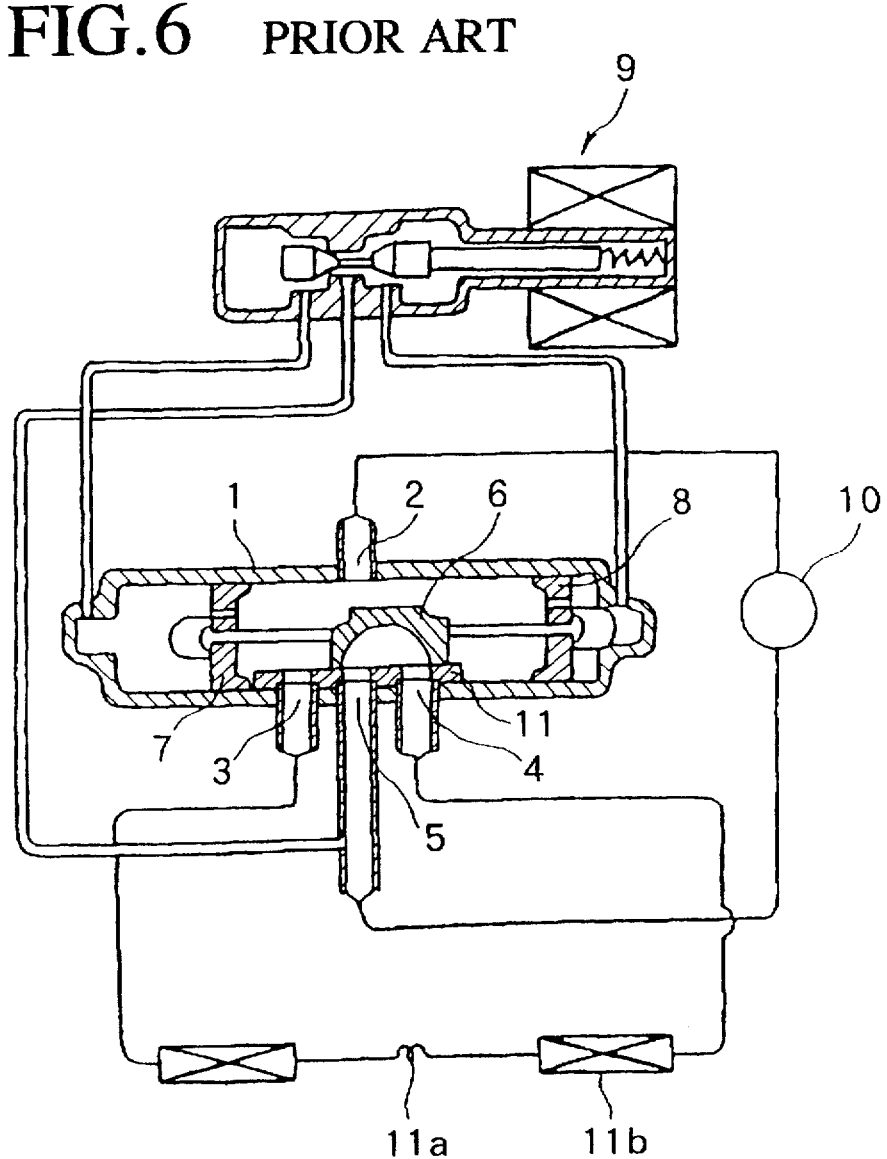
FIG. 6 is a sectional view showing a high-low pressure flowing passage switching device in a conventional heating-cooling apparatus.

One embodiment of the present invention will now be described with reference to FIGS. 1 through 5. It should be noted that reference numerals denoting component parts in FIGS. 1 through 5 have no relation to those of FIG. 6.

A high-low pressure passage switching device in a heating-cooling apparatus according to the present invention includes an air-tight housing 1, and a flowing passage switching rotor 3 rotatable normally and reversely (i.e. forward and in reverse) at a predetermined angle of rotation about a shaft 2 within the housing 1.

The housing 1 is formed of a cylindrical member, and the rotor 3 is formed of a short columnar member, both being made of metal such as iron, copper, aluminum or the like. In the alternative, one or both of the housing 1 and the rotor 3 is made of synthetic resin.

A small space 4 is formed between the housing 1 and the rotor 3 over the entire periphery thereof. This space is filled with low pressure gas as later described.

The rotor 3 is provided with a first switching passage 6 and a second switching passage 7 which are open to a first end face 5 and arranged side by side on a circular orbit about the shaft 2, and also with a third switching passage 8 which is open to a second end face 9 axially opposing the first end face 5. The third switching passage 8 is communicated with the first switching passage 6 and the second switching passage 7 within the rotor 3. The first through third switching passages 6, 7 and 8 are formed in parallel with the above-mentioned shaft. The third switching passage 8 has its center at a middle part between the first switching passage 6 and the second switching passage 7, and has a larger bore than those of the first and second switching passages. Ends of the bores of the first and second switching passages 6 and 7 are communicated at a bore end of the third switching passage 8. Owing to this feature, the work for boring the first through third switching passages and for communicating those passages becomes easier.

Specifically, the rotor 3 is formed of a pure metal block. Then, the first and second switching passages 6 and 7 are formed by boring the rotor 3 from the first end face using a suitable cutting tool and the third switching passage is formed in the same manner from the second end face 9, such that the passages are communicated with each other at an intermediate portion of the block. Reference numeral 10 denotes a communication port.

A cylindrical seal 11 is intimately fitted to an inner peripheral surface of an end portion of each of the switching passages 6, 7, and 8, and end faces of the switching passages 6, 7, and 8 are intimately contacted with an inner surface of a first end wall 12 and an inner surface of a second end wall 13, so that the switching passages 6, 7, and 8 are sealed air tight. On the other hand, a first connecting port 15 to be connected with a high pressure gas outlet port of a compressor 14 is formed in the first end wall 12 of the housing 1, the first end wall 12 being disposed opposite the first end face 5 of the rotor 3.

The first connecting port 15 extends through the first end wall 12, with an outer end thereof being subjected to connection with the compressor 14 and with an inner end thereof being subjected at an inner surface of the first end wall 12 to selective switching with respect to first and second switching passages 6 and 7.

Specifically, the first connecting port 15 is connected to a selected one of the first and second switching passages 6 and 7 which are rotated normally and reversely in accordance with normal and reverse rotation of the rotor 3, so that a high pressure gas is supplied to the selected one of the passages 6 and 7. The unselected switching passage 7 or 6 is intimately contacted with the inner surface of the first end wall and therefore closed.

A second connecting port 17 and a third connecting port 18 to be connected respectively with one and the other ends of a condenser 16 are formed in the second end wall 13 of the housing 1 opposite the second end face 9 of the rotor 3, such that the ports 17 and 18 are arranged side by side on a circular orbit about the shaft 2.

The second and third connecting ports 17 and 18 extend through the second end wall 13, with outer ends thereof being subjected to the condenser 16 and with an inner end of the selected one of the connecting ports 17 and 18 being opened at the inner surface of the second end wall 13 and communicated with the third switching passage 8.

Specifically, a selected one of the second and third connecting ports 17 and 18 is communicated with the third switching passage 8 which is rotated normally and reversely in accordance with normal and reverse rotation of the rotor 3. The unselected connecting port 17 or 18 is caused to be open to the interior of the housing 1.

A fourth connecting port 19 is formed in the second end wall 13. The fourth connecting port 19 is open to the interior of the housing 1 and connected to a low pressure gas inlet port of the compressor 14.

The fourth connecting port 19 extends through the second end wall 13, with an outer end thereof being subjected to connection with the condenser 16 and with an inner end thereof being open at the end face of the second end wall 13.

As shown in FIGS. 1(A) and 1(B), when the rotor 3 is rotated normally, the low pressure gas introduced into the small space 4 within the housing 1 from the condenser 16 through the second connecting port 17 is supplied into the low pressure gas inlet port of the compressor 14 through the fourth connecting port 19.

The high pressure gas compressed by the compressor 14 and discharged from the high pressure gas outlet port flows into a communication passage constituted by the first and third switching passages 6 and 8 through the first connecting port 15, whereas the high pressure gas discharged from the third switching passage is supplied to the condenser 16 through the third connecting port 18 and the low pressure gas from the condenser 16 is supplied to the small space 4 within the housing 1 through the second connecting port 17 so that the housing 1 is filled with the low pressure gas. Then, the low pressure gas in the housing 1 is supplied to the compressor 14 through the fourth connecting port 19.

Through the procedures so far mentioned, a heating state is created.

Figure 1:
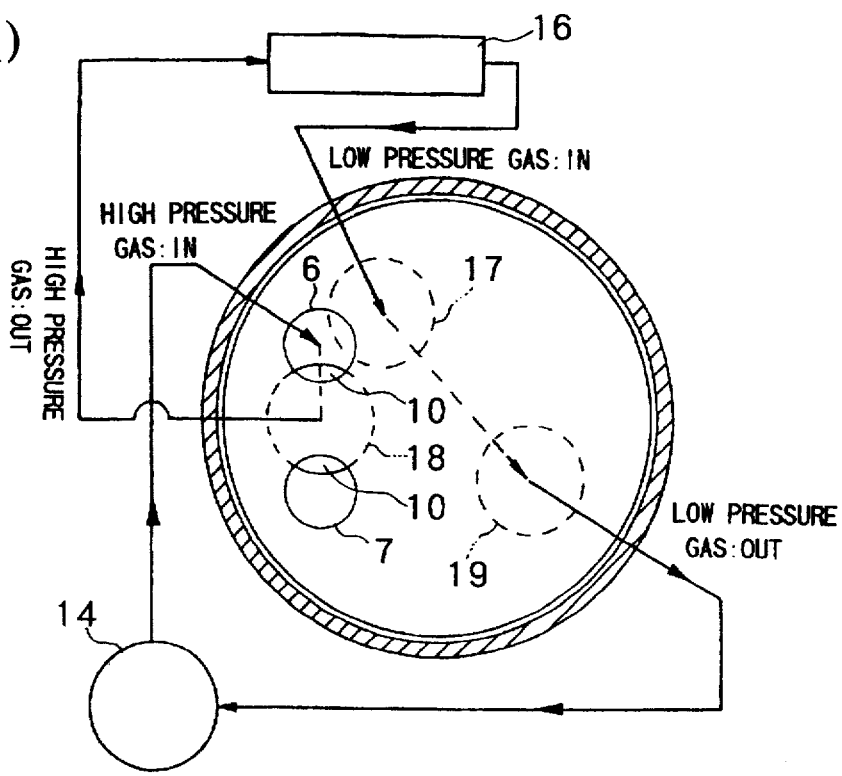
FIG. 1(A) is a sectional view of a switching device taken on line I—I of FIG. 3, showing a heating cycle.
FIG. 1(B) is a vertical sectional view of the switching device of FIG. 1(A)
Figure 1:
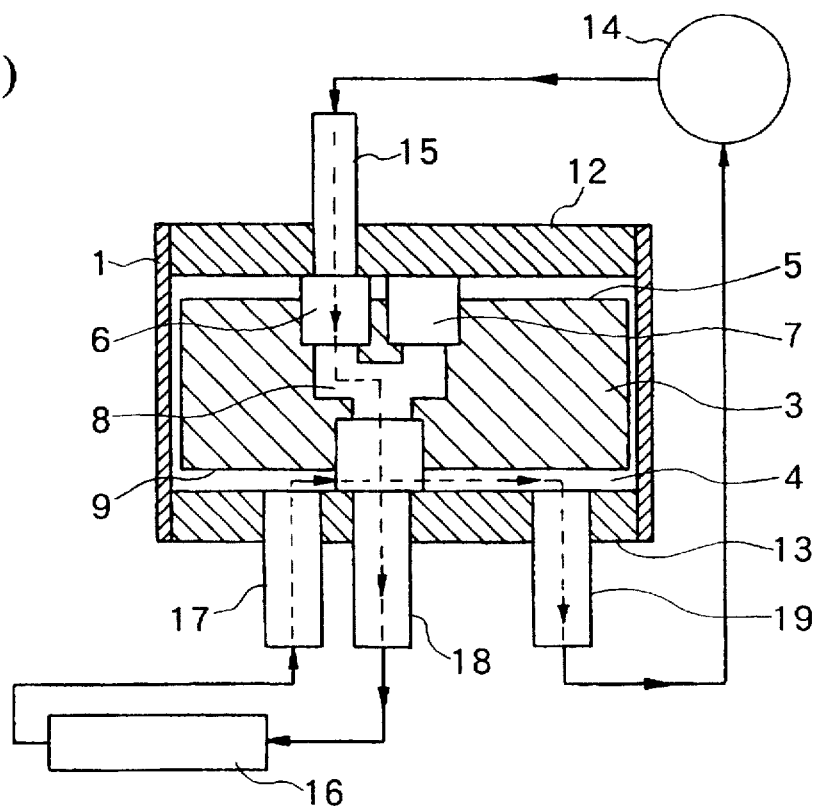
Figure 2A:
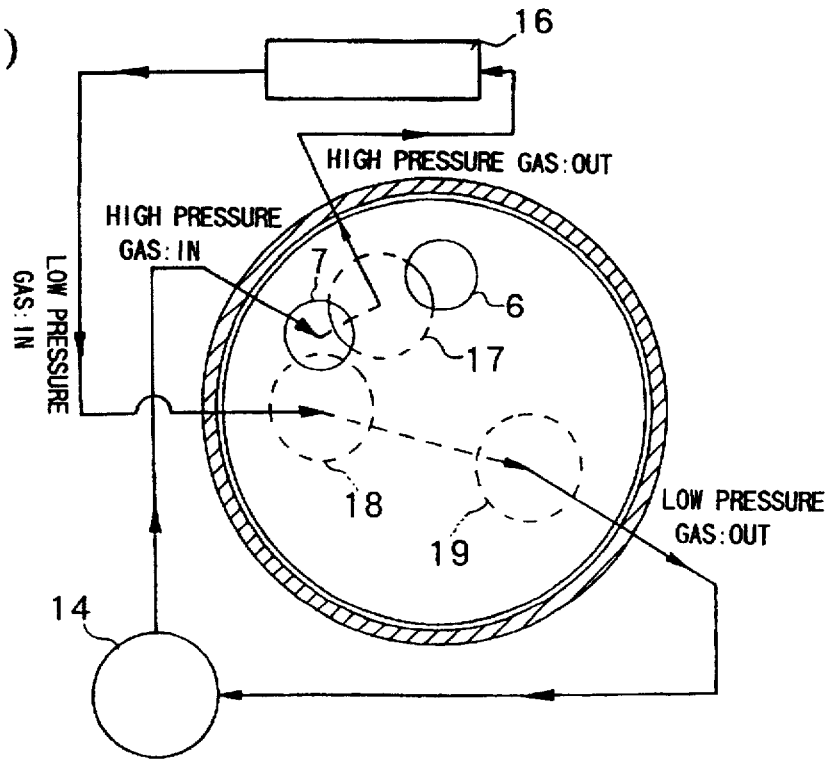
FIG. 2(A) is a sectional view of the switching device taken on line I—I of FIG. 3, showing a cooling cycle.
Figure 2B:
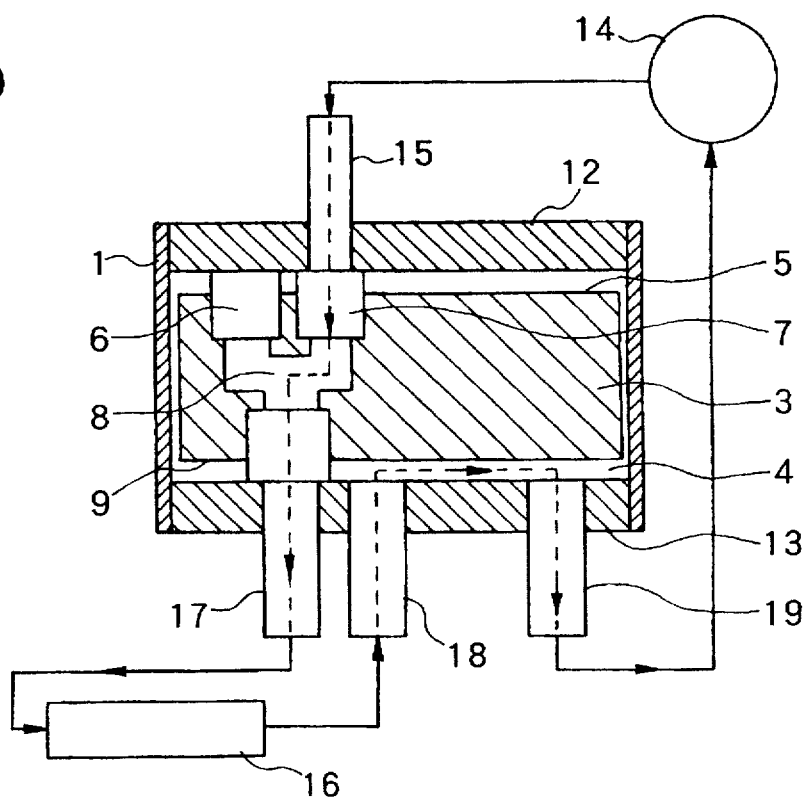
FIG. 2(B) is a vertical sectional view of the switching device of FIG. 2(A)
Figure 3:
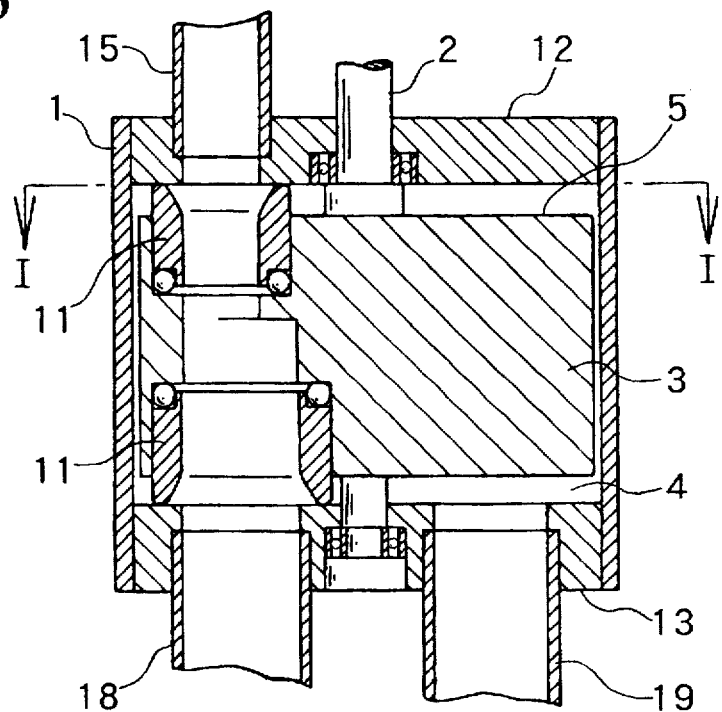
FIG. 3 is a sectional view taken on line III—III of FIG. 5(A)
Figure 4:
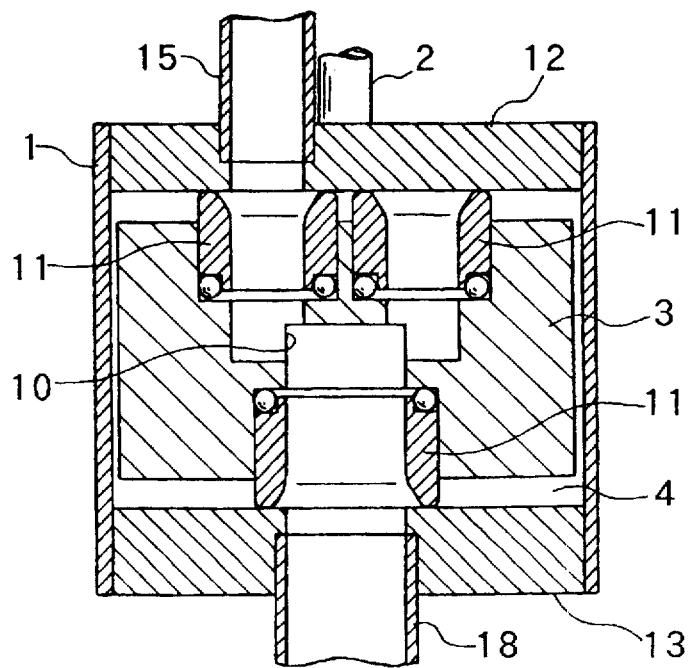
FIG. 4 is a sectional view taken on line IV—IV of FIG. 5(A)
Figure 5A:
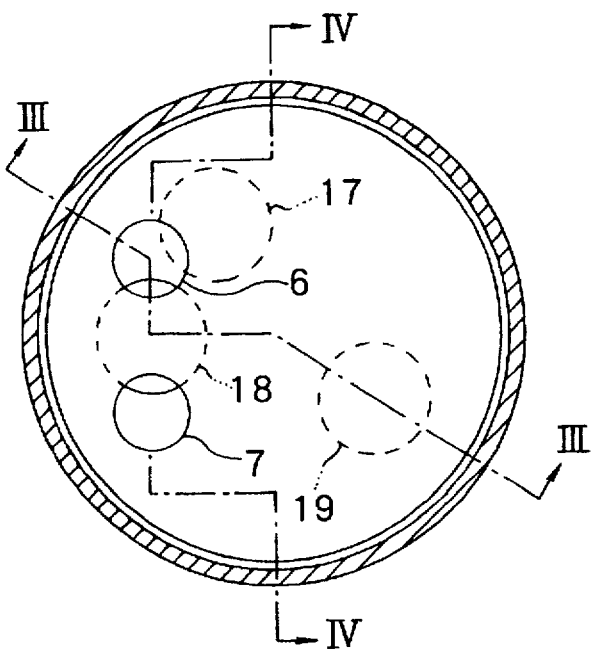
FIG. 5(A) is a vertical sectional view of the switching device.
Figure 5B:
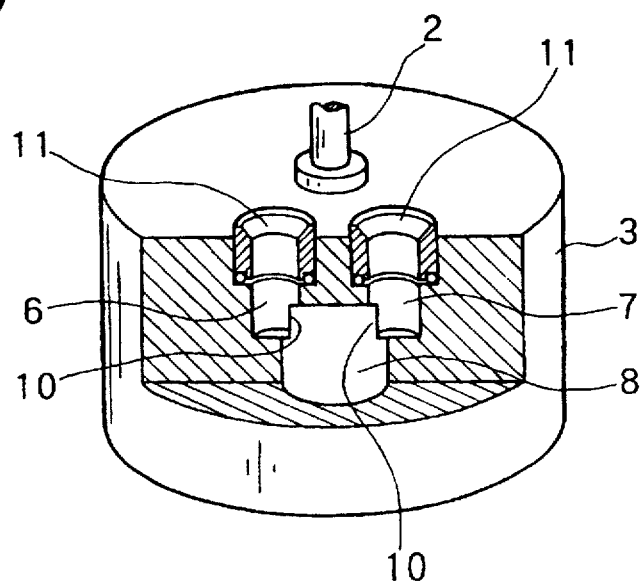
FIG. 5(B) is a perspective view, partly cut-away, of a rotor.

Next, as shown in FIGS. 2(A) and 2(B), when the rotor 3 is rotated in reverse, the low pressure gas introduced to the small space 4 within the housing 1 from the condenser 16 through the third connecting port 18 is supplied to the low pressure gas inlet port of the compressor 14 through the fourth connecting port 19.

The high pressure gas, which is compressed in the compressor 14 and discharged from the high pressure gas outlet port, is allowed to flow into the communication passage constituted by the second and third switching passages 7 and 8 through the first connecting port 15. The high pressure gas discharged from the third switching passage 8 is supplied to the condenser 16 through the second connecting port 17. The low pressure gas from the condenser 16 is supplied to the small space 4 within the housing 1 through the third connecting port 18, so that the housing 1 is filled with the low pressure gas. Then, the low pressure gas within the housing 1 is supplied to the compressor 14 through the fourth connecting port 19.

Through the procedures mentioned above, a cooling state is created.

Each of the above-mentioned switching passages can be formed by boring the rotor made of a pure metal block or while applying an outer configuration to the metal block by casting or forging. In the alternative, each of the switching passages can be formed while forming an outer configuration of the rotor by sintering metal powder. In case the rotor is to be resin molded, injection molding is preferred.

As described in the foregoing, according to the present invention, the housing is normally filled with low pressure gas and the rotor can smoothly be rotated for switching. By virtue of this feature, the inconveniences inherent in the prior art caused by high pressure gas filled in the housing can drastically be obviated. Furthermore, the intended object for attaining an appropriate switching of the flowing passages can satisfactorily be achieved by rotation of the rotor about a fixed axis.

In addition, a high pressure is supplied from the first end face of the rotor through the first switching passage and discharged from the second end face through the second and third switching passages. Accordingly, a difference between the upwardly acting pressure and the downwardly acting pressure along the axis can be diminished as much as possible and an offset load applicable to the rotor can effectively be reduced. As a consequence, insufficient airtight sealing can effectively be prevented by prohibiting inclination of the rotor.

Moreover, it is designed such that the sum of the opening areas of the first and second switching passages is generally the same as the opening area of the third switching passage. Accordingly, the pressure acting upwardly and the downwardly acting pressure are well balanced and the offset load as a cause for inclination of the rotor can effectively be prevented.

Furthermore, the first through third switching passages are formed by boring in parallel with the axis. The third switching passage has its center at a middle pat between the first switching passage and the second switching passage and has a larger bore than those of the first and second switching passages. Ends of the bores of the first and second switching passages are communicated at a bore end of the third switching passage. Accordingly, the work for boring the first through third switching passages and for communicating those passages becomes extremely easy.

What is claimed is:

1. A high-low pressure passage switching device in a heating-cooling apparatus comprising:

an air-tight housing;

a flowing passage switching rotor rotatable normally and reversely at a predetermined angle of rotation about a shaft within said air-tight housing;

said rotor being provided with a first switching passage and a second switching passage which are open to a first end face and arranged side by side on a circular orbit about said shaft, and also with a third switching passage which is open to a second end face axially opposing said first end face, said third switching passage being communicated with said first switching passage and said second switching passage within said rotor, said first through third switching passages being formed in parallel with said shaft;

a first connecting port to be connected with a high-pressure gas outlet port of a compressor being formed in a first end wall of said housing, said first end wall being disposed opposite said first end surface of said rotor, said first connecting port being connected to a selected one of said first and second switching passages which are rotated normally and reversely in accordance with normal and reverse rotation of said rotor;

a second connecting port and a third connecting port to be connected respectively with one and the other ends of a condenser being formed in a second end wall of said housing opposite the second end face of said rotor, such that said second and third connecting ports are arranged side by side on a circular orbit about said shaft;

a selected one of said second and third connecting ports being communicated with said third switching passage which is rotated normally and reversely in accordance with normal and reverse rotation of said rotor, the unselected connecting port being caused to be open to the interior of said housing;

a fourth connecting port formed in the second end wall, said fourth connecting port being open to the interior of said housing and connected to a low pressure gas inlet port of said compressor;

a low pressure gas introduced into said housing from said condenser through the unselected one of said second and third connecting ports being supplied into the low pressure gas inlet port of said compressor through said fourth connecting port; and a high pressure gas discharged from the high pressure gas outlet port of said compressor being caused to flow into a communication passage constituted by the selected one of said first and second switching passages and said third switching passage through said first connecting port, a high pressure gas discharged from said third switching passage being supplied to said condenser through the selected one of said second and third connecting ports.

2. A high-low pressure passage switching device in a heating-cooling apparatus as defined in claim 1, wherein said first through third switching passages are formed in parallel with said shaft, said third switching passage having its center at a middle part between said first switching passage and said second switching passage, said third switching passage having a larger bore than those of said first and second switching passages, ends of the bores of said first and second switching passages being communicated at a bore end of said third switching passage.

3. A high-low pressure passage switching device in a heating-cooling apparatus as defined in claim 1, wherein the sum of opening areas of said first and second switching passages is generally the same as an opening area of said third switching passage.

* * * * *